US008990332B2

(12) United States Patent
Rumsey et al.

(10) Patent No.: US 8,990,332 B2
(45) Date of Patent: Mar. 24, 2015

(54) PERFORMANCE OPTIMIZATION OF A PUBLISH OPERATION

(75) Inventors: Jonathan L. Rumsey, Eastleigh (GB); Tristram T. Reilly, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 12/956,300

(22) Filed: Nov. 30, 2010

(65) Prior Publication Data

US 2011/0153757 A1 Jun. 23, 2011

(30) Foreign Application Priority Data

Dec. 21, 2009 (EP) .................................... 09180152

(51) Int. Cl.
*G06F 15/16* (2006.01)
*H04L 29/08* (2006.01)
*H04L 12/58* (2006.01)

(52) U.S. Cl.
CPC ................ *H04L 67/02* (2013.01); *H04L 51/26* (2013.01); *H04L 67/26* (2013.01); *H04L 67/24* (2013.01); *H04L 51/14* (2013.01); *H04L 67/22* (2013.01); *H04L 67/306* (2013.01)
USPC .......................................... 709/207; 709/213

(58) Field of Classification Search
CPC .............. H04L 12/581–12/582; H04L 12/587; H04L 12/5855; H04L 51/14; H04L 51/24; H04L 51/26; H04L 67/22–67/26
USPC .................. 709/204–207, 217–219
See application file for complete search history.

(56) References Cited

U.S. PATENT DOCUMENTS

| 5,590,269 | A | * | 12/1996 | Kruse et al. ................... 705/7.16 |
| 7,209,916 | B1 | * | 4/2007 | Seshadri et al. ....................... 1/1 |
| 7,315,883 | B2 | * | 1/2008 | Fair et al. ...................... 709/206 |
| 7,706,895 | B2 | * | 4/2010 | Callaghan ........................ 700/17 |
| 7,738,900 | B1 | * | 6/2010 | Manroa et al. ................. 455/519 |
| 8,589,496 | B2 | * | 11/2013 | Boberg et al. ................. 709/206 |
| 2003/0212818 | A1 | * | 11/2003 | Klein et al. .................... 709/238 |
| 2006/0200444 | A1 | * | 9/2006 | Bracho et al. ..................... 707/1 |
| 2007/0143433 | A1 | * | 6/2007 | Daigle .......................... 709/207 |
| 2007/0174391 | A1 | * | 7/2007 | Kuchenhoff et al. ......... 709/206 |
| 2007/0203995 | A1 | * | 8/2007 | Wang et al. ................... 709/206 |
| 2008/0114829 | A1 | * | 5/2008 | Button et al. ................. 709/203 |
| 2008/0134202 | A1 | * | 6/2008 | Craggs et al. ................. 719/313 |
| 2009/0182574 | A1 | * | 7/2009 | Beardall et al. ................... 705/1 |
| 2010/0077038 | A1 | * | 3/2010 | Boberg et al. ................. 709/206 |
| 2011/0153757 | A1 | * | 6/2011 | Rumsey et al. ............... 709/206 |
| 2011/0269441 | A1 | * | 11/2011 | Silver ............................ 455/418 |
| 2011/0282957 | A1 | * | 11/2011 | Wang et al. ................... 709/206 |

* cited by examiner

*Primary Examiner* — Patrice Winder
*Assistant Examiner* — Julian Chang
(74) *Attorney, Agent, or Firm* — Prentiss Johnson;SVL IP Law Edell, Shapiro & Finnan, LLC

(57) ABSTRACT

A solution for performance optimization of a publish operation, for use with a system comprising a publisher to publish a message and to match a subscriber with the published message, embodiments of the solution comprising: in response to the publisher publishing a message, determining whether the matching subscriber is actively waiting for the published message; and in response to determining that the subscriber is not actively waiting, deferring delivery of the published message.

20 Claims, 3 Drawing Sheets

PERFORMANCE OPTIMIZATION OF A PUBLISH OPERATION

CROSS-REFERENCE TO RELATED APPLICATIONS

This application claims the benefit of European Patent Application No. 09180152.2 filed 21 Dec. 2009 and entitled "A METHOD FOR PERFORMANCE OPTIMISATION OF A PUBLISH OPERATION", which is assigned to the assignee of the present application, and the teachings of which are hereby incorporated by reference in their entirety.

BACKGROUND

The disclosure relates to the field of publish and subscribe technologies, and more particularly to performance optimization of a publish operation.

Publish and Subscribe (pub/sub) is an effective way of disseminating information to multiple users. Pub/Sub applications can help to simplify the task of getting business messages and transactions to a wide, dynamically changing and potentially large audience in a timely manner.

In a pub/sub system, publishers are not concerned with where their messages are going, and subscribers are not interested in where the messages they receive have come from. Instead, a broker typically assures the integrity of the message source and manages the distribution of a message according to subscriptions registered in the broker.

SUMMARY

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this summary or detailed description is meant to be construed in a manner that limits the scope of the claimed content expressed herein.

According to a first aspect, there is provided a method for performance optimization of a publish operation, for use with a system comprising a publisher to publish a message and to match a subscriber with the published message, the method comprising: in response to the publisher publishing a message, determining whether the matching subscriber is actively waiting for the published message; and in response to determining that the subscriber is not actively waiting, deferring delivery of the published message.

According to a second aspect, there is provided an apparatus for performance optimization of a publish operation, for use with a system comprising a publisher to publish a message and to match a subscriber with the published message. The apparatus can include a matching engine and a defer apparatus, each comprising a set of instructions able to be executed by a processor where the set of instructions are stored in a storage medium, such as a hard drive, a memory, or other such non-transient or physical storage medium. The matching engine can be operable to, responsive to the publisher publishing a message, determine whether the matching subscriber is actively waiting for the published message. The defer apparatus can be operable to, responsive to determining that the subscriber is not actively waiting, defer delivery of the published message.

According to a third aspect, there is provided a computer program product comprising program code adapted to perform all the steps of the method above when said program is run on a computer.

DETAILED DESCRIPTION

Figure 1:
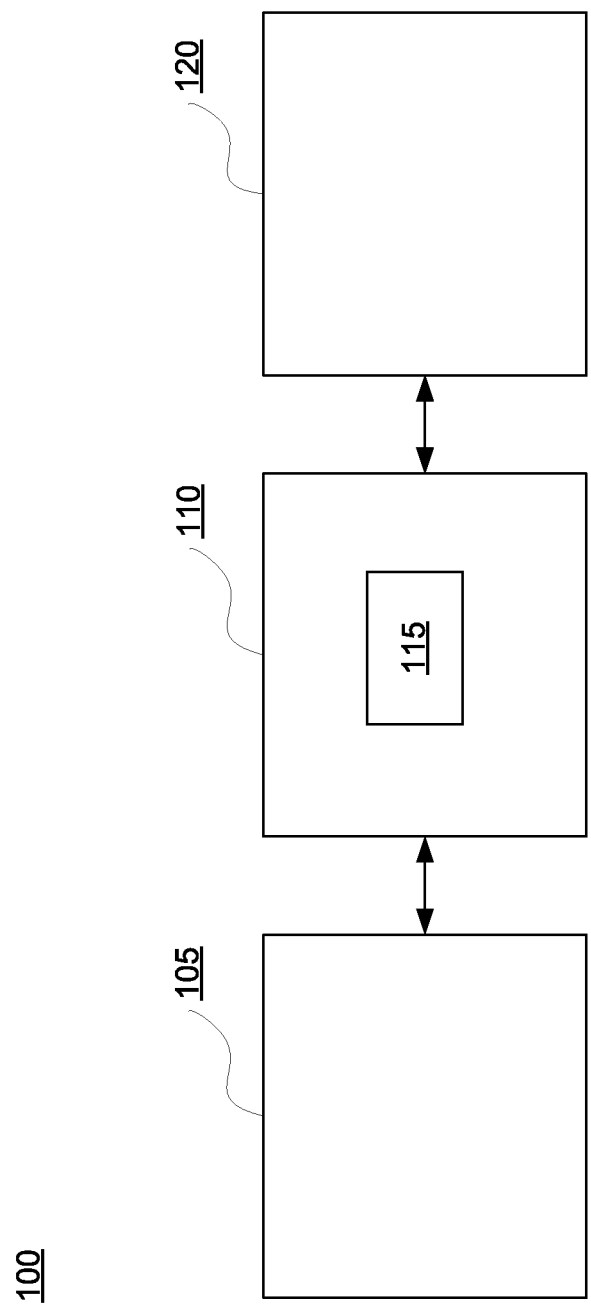
FIG. 1 is a block diagram of a pub/sub system in which the embodiment is implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible, non-transient medium that can contain, or store a program for use by or in connection with an instruction execution system, apparatus, or device.

Program code embodied on a computer readable medium may be transmitted using any appropriate transmission medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the Figures, message topic strings typically provide the key to the delivery of messages between publishers and subscribers. With reference to a pub/sub system (100) as shown in FIG. 1, instead of including a specific destination address in each message, a publisher (105) assigns a topic string to a message. A broker (110) comprises a matching engine (115) for matching a topic string of a published message with a list of subscribers (120) who have subscribed to receive messages that are published to that topic string. In response to a match, the broker (110) sends the published message to the subscriber (120).

In a queued pub/sub environment, publishing a single message to multiple subscribers can involve a performance penalty whilst serializing delivery to the subscribers. For example, if a subscriber is not actively waiting for a message at the time the message is published, the message may need to be queued to disk (e.g., by the publisher or by the broker). This involves a high performance cost at publish time and at the time the subscriber retrieves the message. Further, if the delivery of a message occurs by use of a single thread, the process of queuing and subsequent delivery of the message prevents other subscribers further down in the processing chain from receiving the message in a timely manner.

Figure 2:
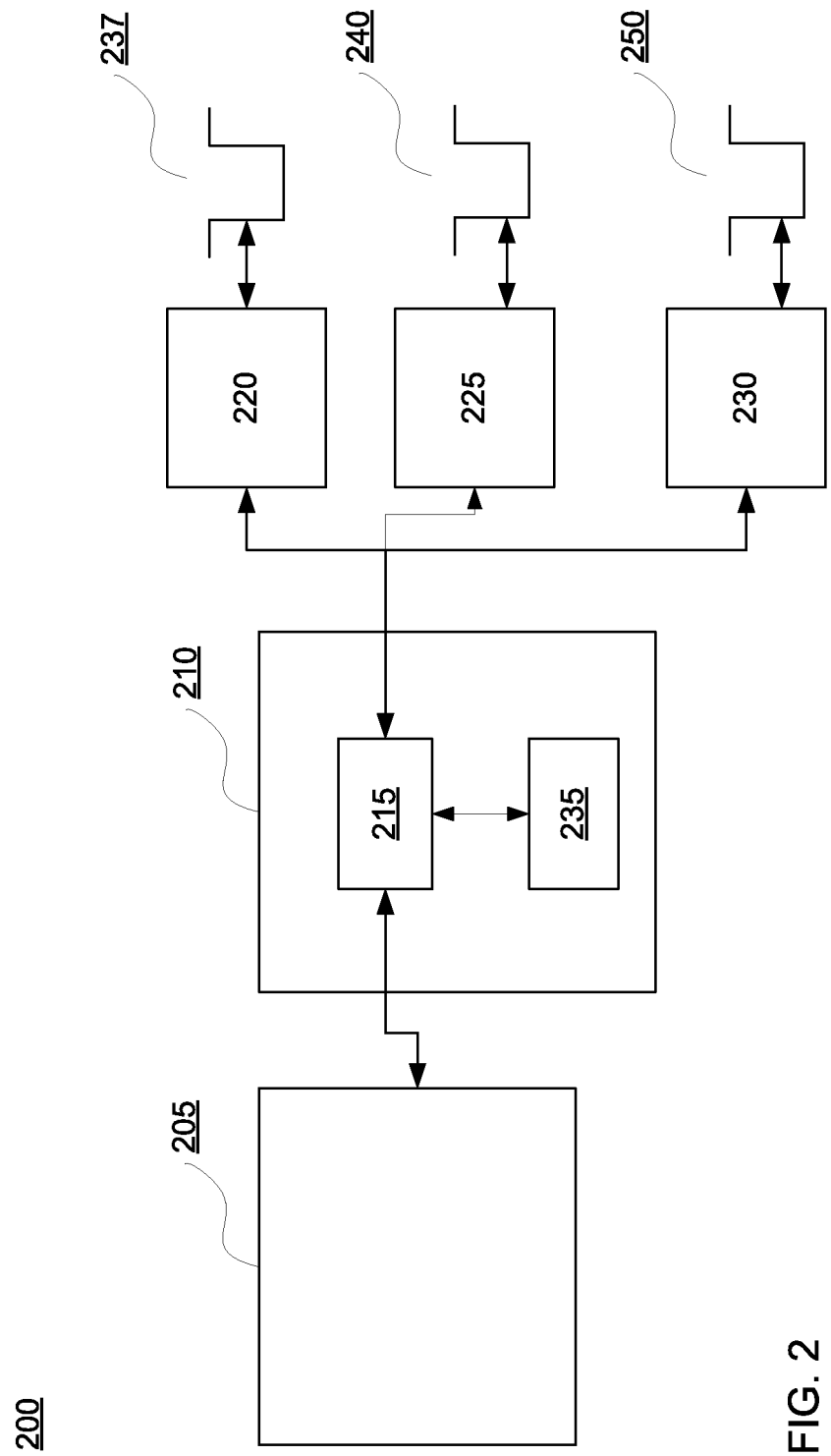
FIG. 2 is a more detailed block diagram of the system of FIG. 1.

With reference to a pub/sub system (200) as shown in FIG. 2, there is depicted a publisher (205); a broker (210) comprising a matching engine (215) and a defer apparatus (235) of the present invention; and a number of subscribers (220, 225 and 230). The subscribers (220, 225 and 230) specify one or more queues (237, 240 and 245) which are used to receive published messages.

One or more applications can be associated with the queues (237, 240 and 245). Note that one or more applications can share access to a queue; in such cases, subscription information further specifies a correlation identifier associated with messages and an application can also specify a correlation identifier.

Figure 3:
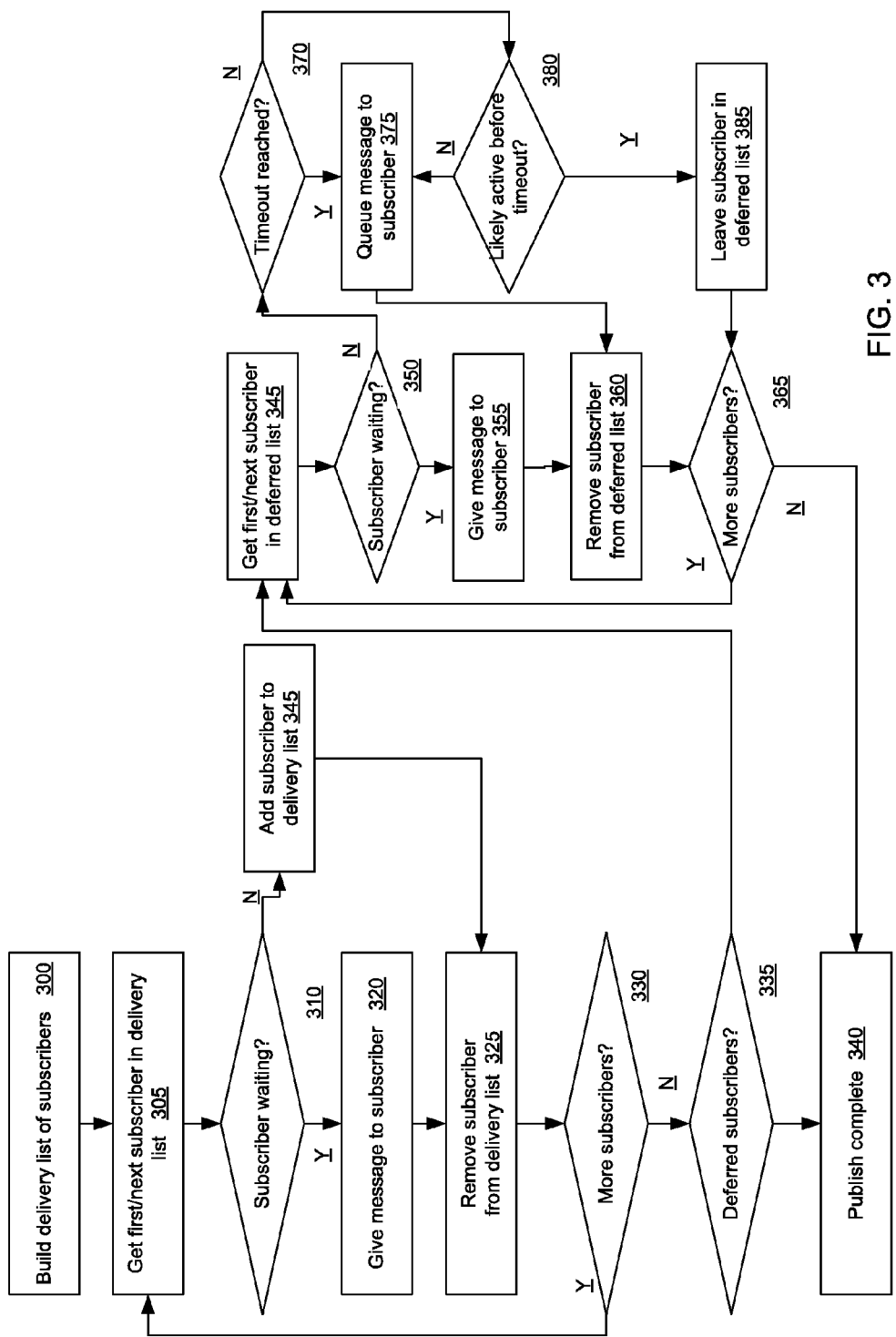
FIG. 3 is a flow chart showing the operational steps involved in a process according to the embodiment.

A process of the embodiment will now be described with reference to FIGS. 2 and 3.

In a pre-processing step, the publisher (205) publishes a message having a topic string. Further, a timeout is configured and average message processing speeds of subscribers are obtained.

At step 300, the matching engine (215) builds a delivery list of subscribers that match the topic string of the published message.

In one embodiment, a lock is established to prevent further subscribers from requesting messages on the published topic.

At step 305, the defer apparatus (235) gets the first subscriber in the delivery list in order to determine (step 310) whether the subscriber is waiting for the message. In one embodiment, the defer apparatus (235) checks status information of a queue associated with the subscriber in order to determine if the subscriber is actively waiting for a message. Note that a waiting subscriber is one that has issued a command to retrieve a message from its queue.

If the defer apparatus (235) determines that the subscriber is waiting for the message, the matching engine (215) sends (step 320) the message directly to the subscriber and at step 325, the defer apparatus (235) removes the subscriber from the delivery list.

If the defer apparatus (235) determines that the subscriber is not waiting for the message, at step 315, the defer apparatus (235) adds the subscriber to a deferred list. At step 325, the defer apparatus (235) removes the subscriber from the delivery list.

At step 330, the defer apparatus (235) checks the delivery list in order to determine whether there are any more subscribers. If there are more subscribers, steps 305 to 325 are repeated such that each subscriber is processed and a delivery list and possibly a deferred list are obtained.

In response to there being no more subscribers, at step 335, the defer apparatus (235) determines whether there are any subscribers in a deferred list. If the defer apparatus (235) determines that there are no subscribers in a deferred list, the publish operation initiated by the publisher (205) is deemed completed (step 340).

If the defer apparatus (235) determines that there are subscribers in a deferred list, at step 345, the defer apparatus (235) gets the first subscriber in the deferred list in order to determine (step 350) whether the subscriber is waiting for the message.

Note that although a subscriber may not have been waiting at step 310, by the time step 350 is reached, the subscriber may indeed be actively waiting, hence the need for the further check at step 350.

If the defer apparatus (235) determines that the subscriber is waiting for the message, the matching engine (215) sends (step 355) the message directly to the subscriber and at step 360, the defer apparatus (235) removes the subscriber from the deferred list. The process passes to step 365 as will be described later.

If, at step 350, the defer apparatus (235) determines that the subscriber is not waiting for the message, at step 370, the defer apparatus (235) determines whether the configured timeout mentioned above has been reached.

If the configured timeout has been reached, the matching engine (215) sends (step 375) the message to the subscriber's queue. At step 360, the defer apparatus (235) removes the subscriber from the deferred list. The process passes to step 365 as will be described later.

If the configured timeout has not been reached, the defer apparatus (235) checks (step 380) the subscriber's average message processing speed against the configured timeout in order to determine whether the subscriber is likely to become active before the timeout is reached.

If the defer apparatus (235) determines that the subscriber is likely to become active before the timeout is reached, at step 385, the defer apparatus (235) leaves the subscriber in the deferred list in order to prevent the expensive operation of queuing. The process passes to step 365 as will be described later.

If the defer apparatus (235) determines that the subscriber is likely not to become active before the timeout is reached, at step 375, the matching engine (215) sends the message to the subscriber's queue. That is, the message is queued to disk as further delay in delivering the published message could be unacceptable. At step 360, the defer apparatus (235) removes the subscriber from the deferred list and the process passes to step 365 as will be described later.

Note that the timeout allows a balance to be achieved between the expensive operation of queuing and prevention of an unacceptable delay in delivering a published message.

At step 365, the defer apparatus (235) checks the deferred list in order to determine whether there are any more subscribers.

If there are more subscribers, steps 345 to 385 are repeated such that either a subscriber receives the message directly, the message is queued or the subscriber is left in the deferred list.

If, at step 365, there are no more subscribers, the publish operation initiated by the publisher (205) is deemed completed (step 340).

Examples of the embodiment will now be described.

In a first example, a timeout is configured to two seconds; Subscriber 1 (220) and Subscriber 3 (230) process messages, on average, every one second and Subscriber 2 (225) processes messages, on average, every ten seconds.

At step 300, the matching engine (215) builds a delivery list of subscribers that match the topic string of the published message, the delivery list comprising Subscriber 1 (220), Subscriber 2 (225), and Subscriber 3 (230).

At step 305, the defer apparatus (235) gets Subscriber 1 (220) in order to determine (step 310) whether Subscriber 1 (220) is waiting for the message.

The defer apparatus (235) determines that Subscriber 1 (220) is waiting for the message and at step 320, the matching engine (215) sends the message directly to Subscriber 1 (220). At step 325, the defer apparatus (235) removes Subscriber 1 (220) from the delivery list.

At step 330, the defer apparatus (235) checks the delivery list to determine if there are any further subscribers.

As there are further subscribers, the defer apparatus (235) gets the next subscriber in the delivery list, namely, Subscriber 2 (225) in order to determine (step 310) whether Subscriber 2 (225) is waiting for the message.

The defer apparatus (235) determines that Subscriber 2 (225) is not waiting for the message and at step 315, the defer apparatus (235) adds Subscriber 2 (225) to a deferred list. At step 325, the defer apparatus (235) removes Subscriber 2 (225) from the delivery list.

At step 330, the defer apparatus (235) checks the delivery list and determine that there is a further subscriber. Responsively, the defer apparatus (235) gets the next subscriber in the delivery list, namely, Subscriber 3 (230) in order to determine (step 310) whether Subscriber 3 (230) is waiting for the message.

The defer apparatus (235) determines that Subscriber 3 (230) is waiting for the message and at step 320, the matching engine (215) sends the message directly to Subscriber 3 (230). At step 325, the defer apparatus (235) removes Subscriber 3 (230) from the delivery list.

At step 330, the defer apparatus (235) checks the delivery list to determine if there are any further subscribers.

As there are no more subscribers, at step 335, the defer apparatus (235) determines whether there are any subscribers in a deferred list.

The defer apparatus (235) determines that Subscriber 2 (225) is in the deferred list and at step 345, the defer apparatus (235) gets Subscriber 2 (225) in order to determine (step 350) whether Subscriber 2 (225) is waiting for the message.

The defer apparatus (235) determines that Subscriber 2 (225) is not waiting for the message and at step 370, the defer apparatus (235) determines whether the configured timeout mentioned above has been reached.

The defer apparatus (235) determines that the configured timeout mentioned above has not been reached and checks (step 380) Subscriber 2's (225) average message processing speed (namely, ten seconds) against the configured timeout (namely, two seconds) in order to determine whether Subscriber 2 (225) is likely to become active before the timeout is reached.

The defer apparatus (235) determines that Subscriber 2 (225) is likely not to become active before the timeout is reached and at step 375, the matching engine (215) send the message to Subscriber 2's (225) queue (240). At step 360, the defer apparatus (235) removes Subscriber 2 from the deferred list.

At step 365, the defer apparatus (235) checks the deferred list in order to determine whether there are any more subscribers and as there are no more subscribers, the publish operation initiated by the publisher (205) is deemed completed (step 340).

In a second example, a timeout is configured to two seconds; Subscriber 1 (220) and Subscriber 3 (230) process messages, on average, every one second and Subscriber 2 (225) processes messages, on average, every ten seconds.

At step 300, the matching engine (215) builds a delivery list of subscribers comprising Subscriber 1 (220), Subscriber 2 (225), and Subscriber 3 (230).

At step 305, the defer apparatus (235) gets Subscriber 1 (220) and determines (step 310) that Subscriber 1 (220) is waiting for the message. Responsively, at step 320, the matching engine (215) sends the message directly to Subscriber 1 (220) and at step 325, the defer apparatus (235) removes Subscriber 1 (220) from the delivery list.

At step 330, the defer apparatus (235) checks the delivery list to determine if there are any further subscribers and as there are further subscribers, the defer apparatus (235) gets the next subscriber in the delivery list, namely, Subscriber 2 (225) in order to determine (step 310) whether Subscriber 2 (225) is waiting for the message.

The defer apparatus (235) determines that Subscriber 2 (225) is not waiting for the message and at step 315, the defer apparatus (235) adds Subscriber 2 (225) to a deferred list. At step 325, the defer apparatus (235) removes Subscriber 2 (225) from the delivery list.

At step 330, the defer apparatus (235) checks the delivery list and determine that there is a further subscriber. Responsively, the defer apparatus (235) gets the next subscriber in the delivery list, namely, Subscriber 3 (230) in order to determine (step 310) whether Subscriber 3 (230) is waiting for the message.

The defer apparatus (235) determines that Subscriber 3 (230) is not waiting for the message and at step 315, the defer apparatus (235) adds Subscriber 3 (230) to a deferred list. At step 325, the defer apparatus (235) removes Subscriber 3 (230) from the delivery list.

At step 330, the defer apparatus (235) checks the delivery list to determine if there are any further subscribers.

As there are no more subscribers, at step 335 the defer apparatus (235) determines whether there are any subscribers in a deferred list.

The defer apparatus (235) determines that there are subscribers in the deferred list and at step 345, the defer apparatus (235) gets Subscriber 2 (225) in order to determine (step 350) whether Subscriber 2 (225) is waiting for the message.

The defer apparatus (235) determines that Subscriber 2 (225) is not waiting for the message and at step 370, the defer apparatus (235) determines whether the configured timeout mentioned above has been reached.

The defer apparatus (235) determines that the configured timeout mentioned above has not been reached and as before, at step 380, the defer apparatus (235) checks Subscriber 2's (225) average message processing speed (namely, ten seconds) against the configured timeout (namely, two seconds) in order to determine whether Subscriber 2 (225) is likely to become active before the timeout is reached.

The defer apparatus (235) determines that Subscriber 2 (225) is likely not to become active before the timeout is reached and at step 375, the matching engine (215) send the message to Subscriber 2's (225) queue (240). At step 360, the defer apparatus (235) removes Subscriber 2 from the deferred list.

At step 365, the defer apparatus (235) checks the deferred list in order to determine whether there are any more subscribers.

The defer apparatus (235) determines that there are subscribers in the deferred list and at step 345, the defer apparatus (235) gets Subscriber 3 (230) in order to determine (step 350) whether Subscriber 3 (230) is waiting for the message.

The defer apparatus (235) determines that Subscriber 3 (230) is now waiting for the message and at step 355, the matching engine (215) sends the message directly to Subscriber 3 (230). At step 360, the defer apparatus (235) removes Subscriber 3 (230) from the deferred list.

At step 365, the defer apparatus (235) checks the deferred list in order to determine whether there are any more subscribers and as there are no more subscribers, the publish operation initiated by the publisher (205) is deemed completed (step 340).

In a third example, with reference to the second example above, at step 350, the defer apparatus (235) determines that Subscriber 3 (230) is not waiting for the message and at step 370, the defer apparatus (235) determines whether the configured timeout mentioned above has been reached.

The defer apparatus (235) determines that the configured timeout mentioned above has not been reached at step 380, the defer apparatus (235) checks Subscriber 3's (230) average message processing speed (namely, one second) against the configured timeout (namely, two seconds) in order to determine whether Subscriber 3 (230) is likely to become active before the timeout is reached.

The defer apparatus (235) determines that Subscriber 3 (230) is likely to become active before the timeout is reached and at step 385, the defer apparatus (235) leaves the Subscriber 3 (230) in the deferred list.

At step 365, the defer apparatus (235) checks the deferred list in order to determine whether there are any more subscribers. As Subscriber 3 (230) is in the deferred list, at step 345, the defer apparatus (235) gets Subscriber 3 (230) in order to determine (step 350) whether Subscriber 3 (230) is waiting for the message.

The defer apparatus (235) determines that Subscriber 3 (230) is now waiting for the message and at step 355, the matching engine (215) sends the message directly to Subscriber 3 (230). At step 360, the defer apparatus (235) removes Subscriber 3 (230) from the deferred list.

At step 365, the defer apparatus (235) checks the deferred list in order to determine whether there are any more subscribers.

As there are no more subscribers, the publish operation initiated by the publisher (205) is deemed completed (step 340).

Alternatively, if, at step 370, the defer apparatus (235) determines that the configured timeout mentioned above has been reached, at step 375, the matching engine (215) sends the message to Subscriber 3's (230) queue (245). At step 360, the defer apparatus (235) removes Subscriber 3 (230) from the deferred list.

At step 365, the defer apparatus (235) checks the deferred list in order to determine whether there are any more subscribers.

As there are no more subscribers, the publish operation initiated by the publisher (205) is deemed completed (step 340).

In one embodiment, the embodiment provides a "two-pass" approach to delivering a published message to a mixture of active and inactive subscribers by deferring delivery for inactive subscriptions based on latency associated with subscriber activity.

Note that the deferred list is iterated through after each active subscriber has received their copy of the message. The deferred list is cross referenced against a subset of the list of waiting subscribers that have become active since the publish operation started.

If a subscriber has not become active within a configured timeout, the decision is made to queue the message so that other subscribers further down in the processing chain have the opportunity to receive a copy of the message within an acceptable threshold.

In one embodiment, delivery to infrequently active subscribers can still be queued; however, queued delivery to such subscribers is deferred until the latest possible opportunity.

In one embodiment, the timeout is configurable (e.g., in line with one or more average time periods for previous publish operations).

In one embodiment, an option as to whether the defer apparatus is invoked is associated with a number of subscribers to achieve the best overall performance (e.g., the defer apparatus may be more efficient when there is a relatively larger number of subscribers).

In one embodiment, the performance of the defer apparatus is increased by offloading delivery of the deferred list processing to secondary threads.

Note that in one embodiment, new subscribers are not precluded from subscribing to the topic of the published message once iteration of the deferred list begins. Rather, a secondary list of the new active subscribers is kept during the time that the published message is being delivered. Once the publish operation is deemed completed, the lock that was established to prevent further subscribers from requesting messages on the published topic is released and the secondary list is added to a delivery list that is built for the next published message.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performance optimization of a publish operation, for use with a system comprising a publisher to publish a message and to match a subscriber with the published message, the method comprising:
   in response to the publisher publishing the message, determining whether the subscriber is actively waiting for the published message;
   in response to determining that the subscriber is not actively waiting, deferring delivery of the published message; and
   in response to determining that a configurable timeout has not been reached, determining whether the subscriber is likely to be actively waiting before the configurable timeout is reached.

2. A method as claimed in claim 1, further comprising in response to determining that the subscriber is not actively waiting:
   removing the subscriber from a delivery list; and
   adding the subscriber to a deferred delivery list.

3. A method as claimed in claim 1, further comprising:
   in response to determining that the configurable timeout has been reached, writing the published message to disk.

4. A method as claimed in claim 3, further comprising in response to determining that the configurable timeout has been reached:
   removing the subscriber from a deferred delivery list.

5. A method as claimed in claim 1, further comprising:
   in response to determining that the subscriber is likely to be actively waiting, continuing the deferred delivery of the published message.

6. A method as claimed in claim 1, further comprising:
   in response to determining that the subscriber is likely to not be actively waiting, writing the published message to disk.

7. A method as claimed in claim 1, wherein the determining whether the subscriber is likely to be actively waiting further comprises:
   analyzing a stored metric associated with the subscriber.

8. A method as claimed in claim 7, wherein the stored metric comprises an average message processing speed.

9. A method as claimed in claim 1, further comprising:
   in response to deferring delivery of the published message, re-determining whether the subscriber is actively waiting; and
   in response to determining that the subscriber is actively waiting, delivering the published message to the subscriber.

10. A computer program product for performance optimization of a publish operation, for use with a system comprising a publisher to publish a message and to match a subscriber with the published message, the computer program product comprising a non-transitory computer readable storage medium having computer usable program code embodied therewith, the computer usable program code comprising:
    computer usable program code that when executed by a processor is operable to, in response to the publisher publishing the message, determine whether the subscriber is actively waiting for the published message;
    computer usable program code that when executed by a processor is operable to, in response to determining that the subscriber is not actively waiting, deferring delivery of the published message; and
    computer usable program code that when executed by a processor is operable to, in response to determining that a configurable timeout has not been reached, determining whether the subscriber is likely to be actively waiting before the configurable timeout is reached.

11. The computer program product as claimed in claim 10, further comprising:
    computer usable program code that, when executed by a processor and in response to determining that the subscriber is not actively waiting is operable to:
    remove the subscriber from a delivery list; and
    add the subscriber to a deferred delivery list.

12. The computer program product as claimed in claim 10, further comprising:
    computer usable program code that when executed by a processor is operable to, in response to determining that the configurable timeout has been reached:
    write the published message to disk; and
    remove the subscriber from a deferred delivery list.

13. The computer program product as claimed in claim 10, further comprising:
    computer usable program code that when executed by a processor is operable to, in response to determining that the subscriber is likely to be actively waiting, continue the deferred delivery of the published message.

14. The computer program product as claimed in claim 10, wherein the computer usable program code determines whether the subscriber is likely to be actively waiting by analyzing a stored metric associated with the subscriber.

15. The computer program product as claimed in claim 10, further comprising:
    computer usable program code that when executed by a processor is operable to, in response to deferring delivery of the published message, re-determine whether the subscriber is actively waiting; and
    computer usable program code that when executed by a processor is operable to, in response to determining that the subscriber is actively waiting, deliver the published message to the subscriber.

16. An apparatus for performance optimization of a publish operation, for use with a system comprising a publisher to publish a message and to match a subscriber with the published message, the apparatus comprising at least one processor configured to:
- in response to the publisher publishing the message, determine whether the subscriber is actively waiting for the published message;
- in response to determining that the subscriber is not actively waiting, defer delivery of the published message; and
- in response to determining that a configurable timeout has not been reached, determine whether the subscriber is likely to be actively waiting before the configurable timeout is reached.

17. The apparatus as claimed in claim 16, wherein said at least one processor, in response to determining that the subscriber is not actively waiting, is further configured to:
- remove the subscriber from a delivery list; and
- add the subscriber to a deferred delivery list.

18. The apparatus as claimed in claim 16, wherein said at least one processor is further configured to send the message to a queue of the subscriber when the configurable timeout has been reached.

19. The apparatus as claimed in claim 16, Wherein said at least one processor is further configured to:
- when the subscriber is likely to be actively waiting, continue to defer delivery of the published message; and
- when the subscriber is not likely to be actively waiting, write the published message to disk.

20. The apparatus as claimed in claim 16, wherein the at least one processor is configured to determine whether the subscriber is likely to be actively waiting by analyzing at least one stored metric associated with the subscriber, wherein said at least one stored metric comprises an average message processing speed of the subscriber.

* * * * *